July 22, 1952              J. ELMER              2,604,333
COMBINATION BASSINET, STROLLER, AND PLAYPEN
Filed Feb. 16, 1950              5 Sheets-Sheet 1
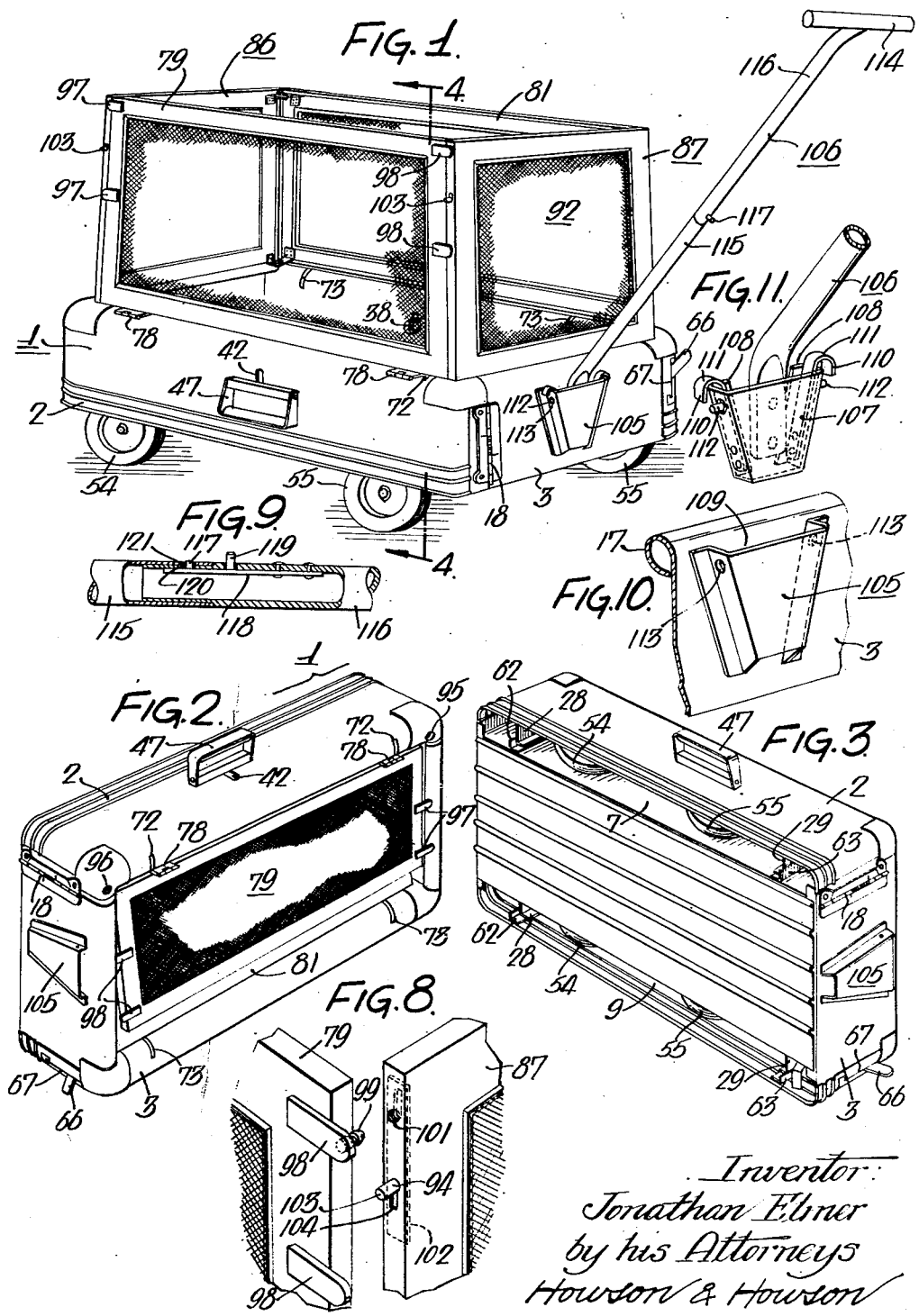
Inventor:
Jonathan Elmer
by his Attorneys
Howson & Howson

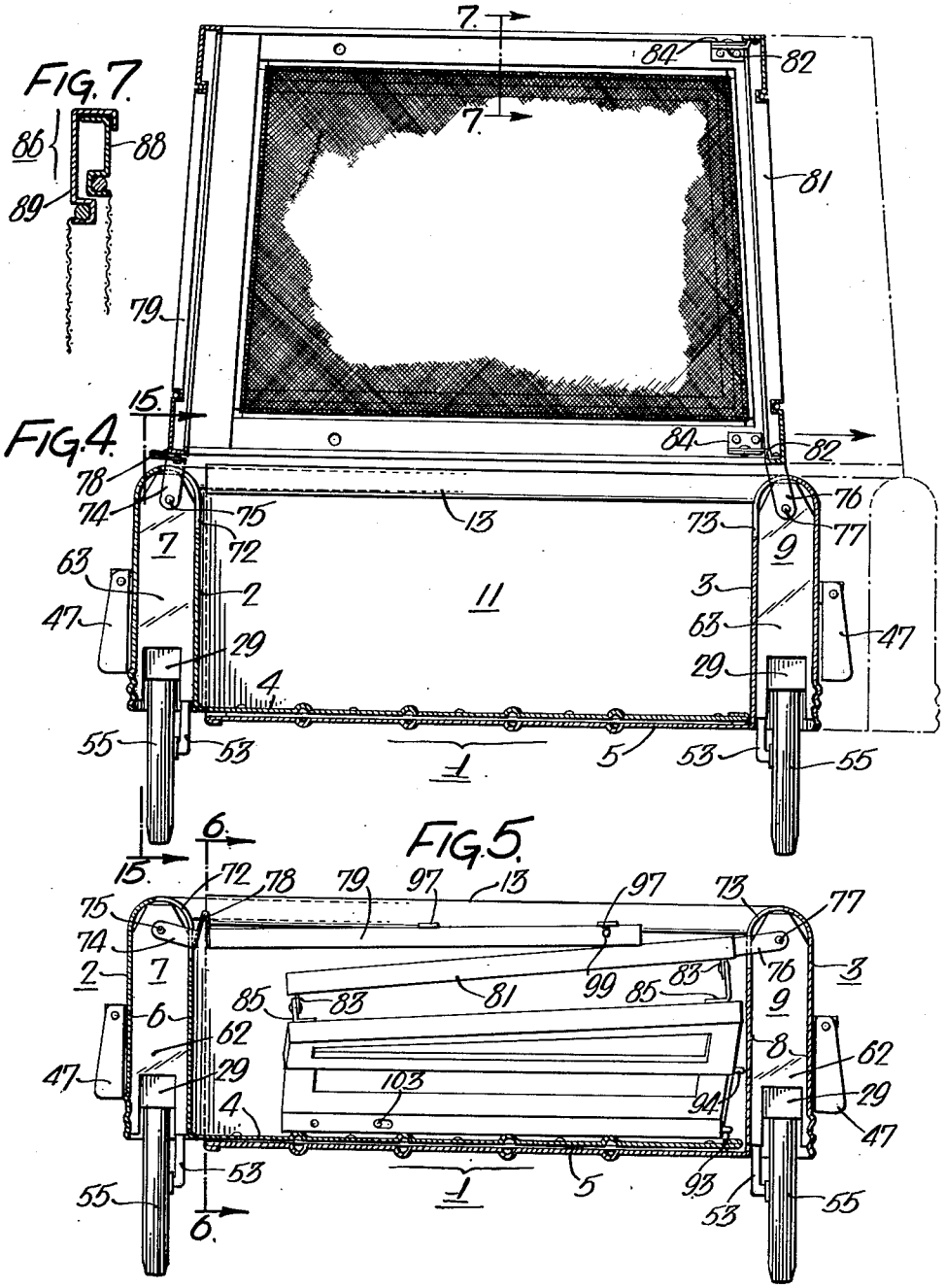

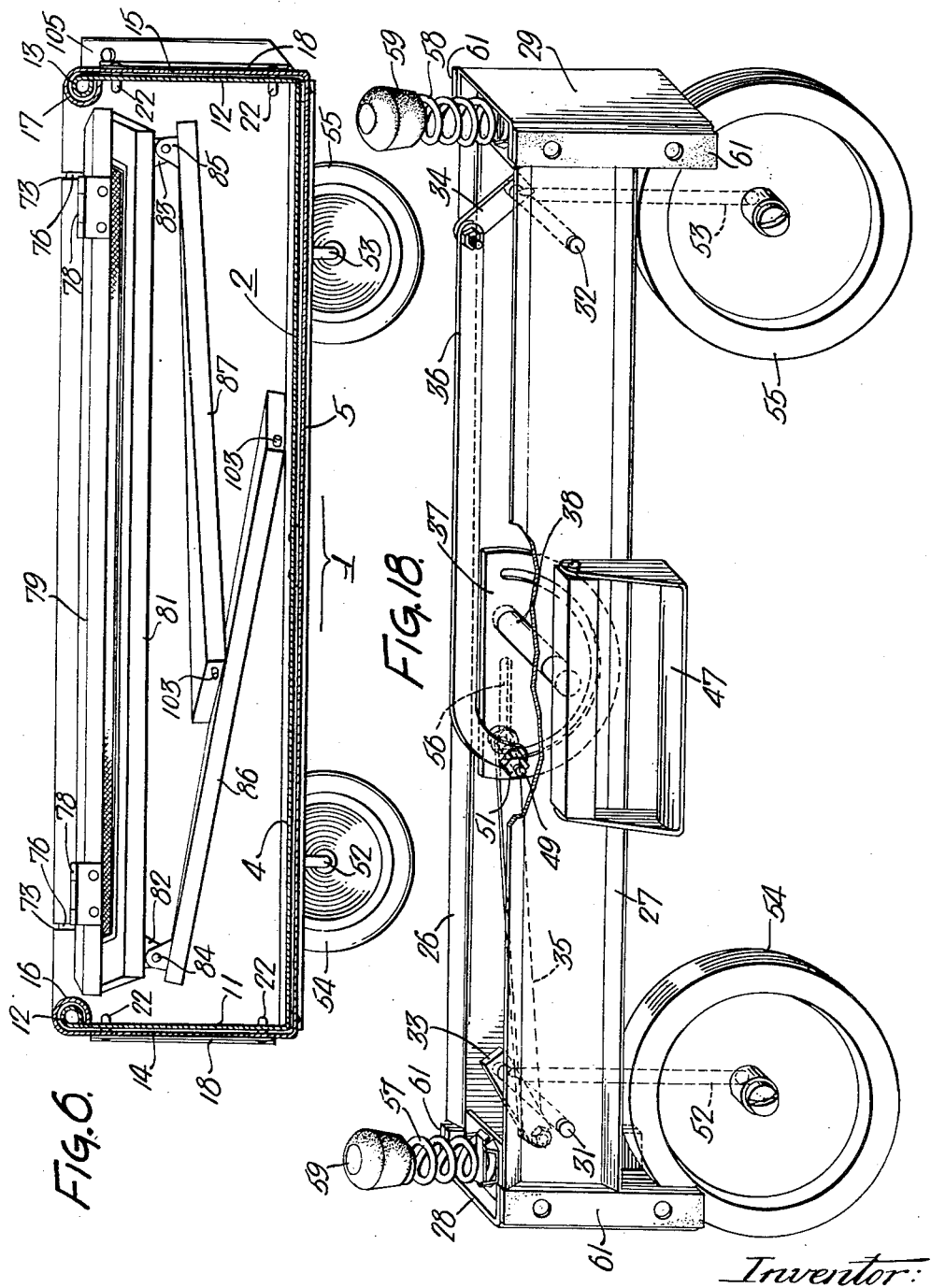

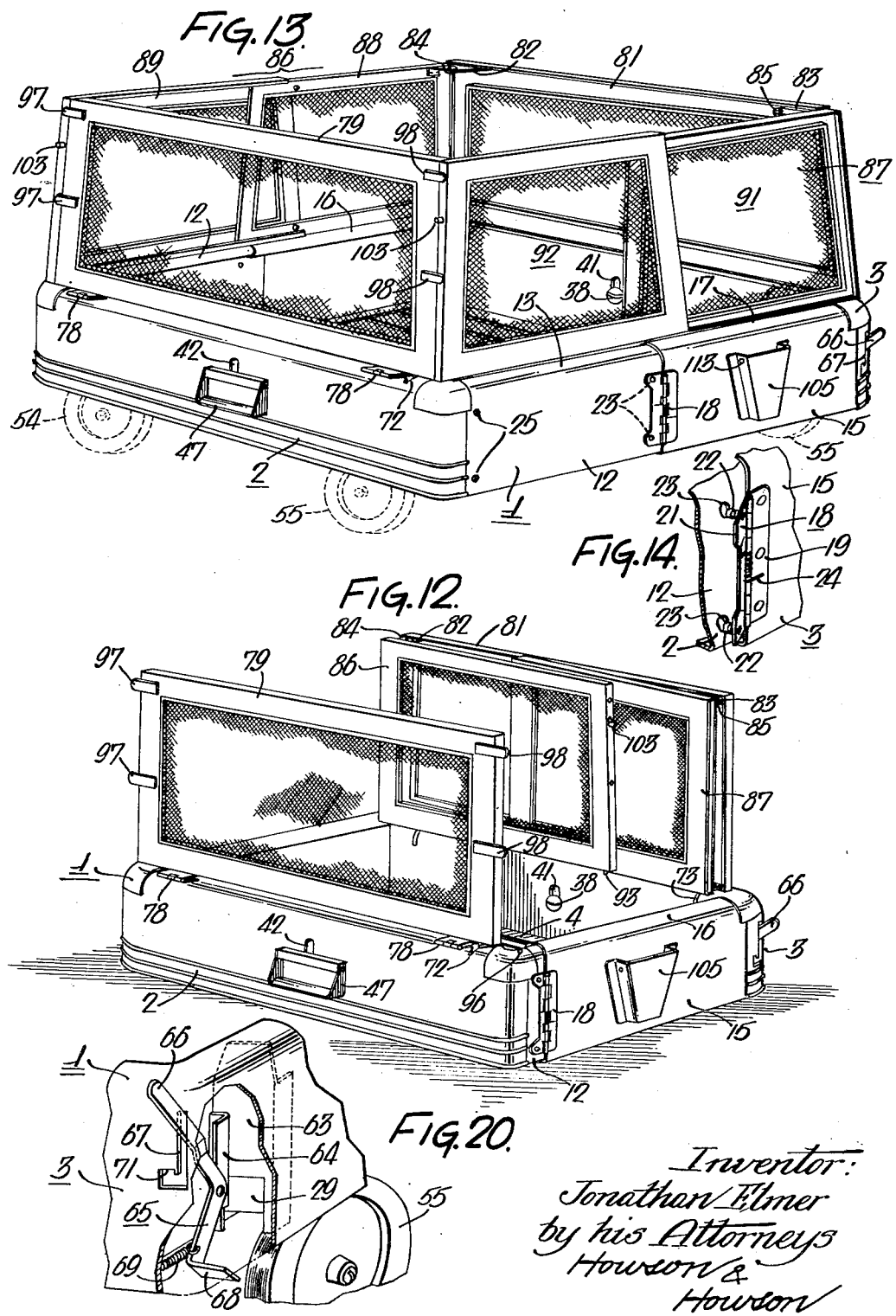

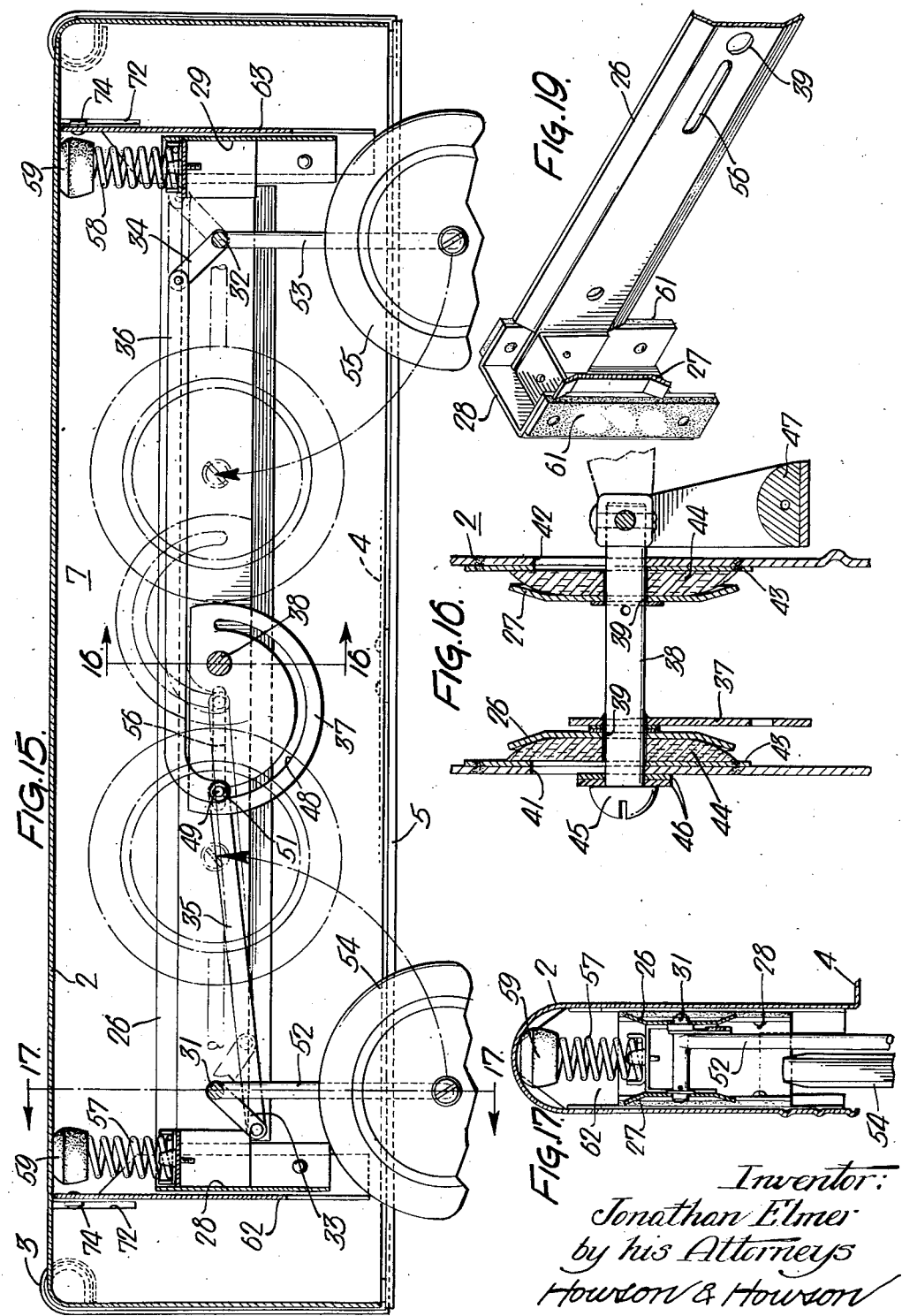

Patented July 22, 1952

2,604,333

UNITED STATES PATENT OFFICE 2,604,333

COMBINATION BASSINET, STROLLER, AND PLAYPEN

Jonathan Elmer, Wayne, Pa.

Application February 16, 1950, Serial No. 144,491

10 Claims. (Cl. 280—37)

A principal object of this invention is to provide in the form of a portable, foldable, self-contained unit a device capable of functioning efficiently and selectively for the several purposes of a bassinet, stroller and a playpen.

A more specific object of the invention is to provide a device of the stated type which can be folded into a relatively small substantially rectangular package having appropriately positioned handle means for transportation purposes.

Another object of the invention is to provide a device of the aforesaid characteristics made substantially throughout of steel or other lightweight material so as to reduce the overall weight to a practical minimum.

A further object of the invention is to provide a combination utility device of the stated type having a set of supporting wheels which may be extended and retracted as required by means of simple and uncomplicated mechanism so as to occupy selective operative and inoperative positions with respect to the structure as a whole.

A still further object of the invention is to provide a device having retractable wheels together with an effective spring suspension interposed between the wheel assemblies and the body of the device.

Still another and more specific object of the invention is to provide a device of the stated character comprising a body portion composed of telescoping elements affording a means for varying the effective dimensions of the body together with extension elements having hinged connection with the respective sides of the body and adapted to form a screened superstructure, said elements also being provided with telescoping parts so as to render the superstructure adjustable with the telescoping elements of the body.

The invention also resides in certain novel structural details and arrangements hereinafter described and illustrated in the attached drawings wherein:

Fig. 1 is a view in perspective of the device converted for stroller purposes;

Fig. 2 is a view in perspective of the device folded to its smallest compass for purpose of transportation;

Fig. 3 is a corresponding view in perspective showing the opposite side of the folded unit;

Fig. 4 is a sectional view on the line 4—4, Fig. 1;

Fig. 5 is a sectional view corresponding to Fig. 4 showing the hinged screen elements folded into the interior of the body;

Fig. 6 is a sectional view on the line 6—6, Fig. 5;

Fig. 7 is a sectional view on the line 7—7, Fig. 4;

Fig. 8 is a fragmentary view in perspective showing a detail of the screened superstructure;

Fig. 9 is a fragmentary sectional view of the mid-section of the handle element shown in Fig. 1;

Fig. 10 is an enlarged fragmentary perspective view showing the handle socket;

Fig. 11 is a view in perspective of the mating end portion of the handle element;

Fig. 12 is a view in perspective of the body portion of the device with the wheels retracted and with the hinged screen elements of the superstructure elevated and in partly-folded relation;

Fig. 13 is a view in perspective of the body portion in fully extended condition and with the screen elements and in the operative and similarly extended position;

Fig. 14 is a fragmentary view in perspective showing a detail of the body structure;

Fig. 15 is a sectional view on the line 15—15, Fig. 4;

Fig. 16 is a sectional view on the line 16—16, Fig. 15;

Fig. 17 is a sectional view on the line 17—17, Fig. 15;

Fig. 18 is a view in perspective of one of the wheel assemblies apart from the body structure;

Fig. 19 is a fragmentary view in perspective showing one end of the frame of the wheel assembly shown in Fig. 18; and Fig. 20 is a fragmentary sectional perspective view showing the details of the brake device.

With reference to the drawings, the device forming the subject matter of the invention consists of a body portion 1 which is composed of two telescoping half-sections, 2 and 3 respectively (see Figs. 4 and 5), said sections being slidably connected so that the effective width of the body member can be varied. As illustrated, each of the body sections 2 and 3 comprises a floor or base panel, 4 and 5 respectively, which occupy the relative positions shown in Figs. 4 and 5. The section 2 also comprises a hollow side wall 6 which extends upwardly from one edge of the base panel 4 and then turns back upon itself to form an open bottom chamber 7, the function of this chamber being hereinafter described. The section 3 has a similar hollow side wall structure designated by the reference numeral 8 and forming an open bottom chamber 9 corresponding to the chamber 7. The section 2 also comprises front and rear walls, 11 and 12 respectively, which extend upwardly from the ends of the floor panel 4 and are turned inwardly at their upper ends to form cylindrical beads 12 and 13. The section 3 has similar front and rear walls 14 and 15 which extend upwardly from the corresponding edges of the floor panel 5 outside of the walls 11 and 12 of the section 2 (see Fig. 6), the upper edges of the walls 14 and 15 also being turned inwardly to form hollow cylindrical beads 16 and 17 which embrace the beads 12 and 13 of the walls 11 and 12 to form a telescopic joint which permits relative sliding movement of the sections while still retaining them in their normal relative positions. It will be apparent, therefore, that these sections may be adjusted between the retracted position in which they are shown in Figs. 4, 5 and 12, and the relatively extended position shown in Fig. 13.

In order to maintain the sections of the body in each of these alternative relative positions, I provide a latching device designated generally by the reference numeral 18 and shown in detail in Fig. 14. As therein illustrated, the rear wall 15 has secured thereto at its edge a hinge plate 19 which is pivotally connected to a plate 21, the latter plate extending beyond the edge of the wall and carrying projecting pins 22—22 which are arranged to engage in apertures 23—23 in the wall 12 of the sections 2. A spring 24 urges the plate 21 toward the wall 12 and thereby tends to maintain the pins in the apertures 23. As shown in Figs. 12 to 14, inclusive, the wall 12 of the section 2 is provided with two sets of pin-receiving apertures, the set 23—23 being located for engagement with the pins when the two sections of the body are in the relatively extended positions as shown in Fig. 13; and the second set of apertures, 25—25, being located in proximity to the side wall 6 of the section 2 so that when the sections 2 and 3 are retracted one into the other, the pins 22 of the latching plate will be brought into engagement with the holes 25—25 at the point of maximum retraction. It will be understood that a latching device similar to that described above will be provided also at the front end of the body structure.

As previously set forth the side walls of the sections 2 and 3 are formed with open bottom chambers 7 and 9 respectively. These chambers form housings for wheel assemblies within which housings the said wheels may be retracted, as illustrated in Fig. 3, and from which the wheels may be extended to provide support for the body structure described above. In the present instance the wheel assemblies are formed as units, one of said units being illustrated in Fig. 18. With reference to Fig. 18, and to Figs. 15, 16, 17 and 19, each of these wheel assemblies comprises a frame consisting of spaced longitudinal side plates, 26 and 27 respectively, which are connected together at their opposite ends and are rigidly secured in laterally spaced relation by upright channels 28 and 29, said side plates and channels forming a rigid wheel supporting frame. Journaled in each end of this frame, in and between the side plates 26 and 27, is a shaft, 31 and 32 respectively, to which are secured arms 33 and 34 respectively, said arms being operatively connected through rods 35 and 36 with a cam 37. This cam is secured to a pin 38 which is journaled in apertures 39, 39 in the side plates 26 and 27.

When the wheel assembly is mounted in the body 1, the respective ends of the pin 38 extend through slotted openings 41 and 42 in the walls of the chamber 7 or 9, as the case may be, it being understood that the wheel assemblies are housed individually in these chambers. In the areas of the slots 41, the side walls of the chambers are reinforced by correspondingly slotted plates 43 which are welded to the inner faces of the wall panels. Between the relatively fixed plates 43 and the respective side plates 26 and 27 of the wheel assembly frame, and supported in each instance upon the ends of the pin 38, is a pad 44 of fibre or other suitable material which provide sliding bearings for the wheel assembly frames on the inner surfaces of the walls of the housing chambers. This is clearly illustrated in Fig. 16. One end of the pin 38, i. e., that end which extends through the inner walls of the housing chamber 7 or 9 as the case may be, has a head 45, and washer elements 46 are interposed between this head and the confronting surface of the housing wall so as to permit the head to slide freely over the surface at opposite sides of the slot 41. The opposite end of the pin 38, which projects through the outer wall of the chamber is provided with a pivotally attached handle 47 by means of which the pin may be rocked about its axis in and with respect to the side plates 26 and 27 of the wheel frame and the walls of the housing chamber.

As shown in Fig. 15 the cam 37 is provided with a semicircular slot 48 which is disposed eccentrically with respect to the axis of the pin 38. Extending freely through this slot 48 from one side of the cam plate to the other, is a bolt 49 which passes also through suitable apertures in the ends of the rods 35 and 36, the connection being secured by means of a nut 51 on the outer end of the bolt. When the cam 37 is actuated by rotation of the pin 38 through the medium of the handle 47, as previously described, the connecting rods 35 and 36 will act through the arms 33 and 34 to rotate the shafts 31 and 32, it being noted by reference to Figs. 15 and 18 that the inner end of the bolt 49 is slidably secured in a slot 56 in the side plate 26 of the wheel assembly frame so that the bolt in its actuation by the cam 37 is guided in a rectilinear path longitudinally of the frame. The shafts have rigidly connected thereto, arms 52 and 53 on the outer ends of which are journaled wheels 54 and 55 respectively. The arrangement is such that when the bolt 49 occupies one end of the cam slot 48, the shafts 31 and 32 will have been rocked to a position wherein the arms 52 and 53 occupy a substantially vertical position as shown in solid lines in Fig. 15, wherein the wheels will extend below the lower edges of the housing chambers 7 and 9 in operative positions for support of the body structure 1. When, on the other hand, the cam has been rotated through approximately 180° to the position shown in broken lines in Fig. 15, the bolt 49 then occupying the other end of the cam slot, the shafts 31 and 32 will have been rocked so as to retract the wheels into the housing to positions shown in broken lines in Fig. 15 so that the body 1 may, if desired, rest solidly upon the floor or other support surface.

As shown in Figs. 15, 17 and 18 coil springs 57 and 58 are mounted at the respective ends of the wheel assembly frame and project upwardly from the latter. Each of these springs carries at its upward end a rubber or other suitable tip 59 which, in assembly, and as illustrated in Figs. 15 and 17, seat against the upper wall of the housing chamber 7 or 9 as the case may be. The springs are under compression and tend to force the entire frame downwardly in the chamber to the point where the pin 38 engages the bottom of the slots 41 and 42 in the chamber walls. In this position the frame may rock under applied forces about the pin 38 as an axis, such rocking motion being under resilient control of the springs 57 and 58. Also the wheel assembly frame may move rectilinearly upwardly in the housing chambers against the pressure of the springs 57 and 58, this latter movement of the frame is provided for by the slots 41 and 42.

It will be noted by reference to Figs. 15, 17 and 19 that the upright channels 28 and 29 are provided at their opposite sides with face plates 61 and in assembly these plates slidably engage the opposite sides of channels 62 and 63 which are welded to and between the walls of each of the housing chambers 7 and 9. These channels 62 and 63 thereby constitute guides for the ends of the wheel assembly frame, stabilizing the frames against thrusts tending to displace them laterally or angularly in the housing chamber.

With reference to Fig. 20, it will be noted that one of the guide channels 63 at the rear end of the body 1 is provided with a projecting flange 64 on which is pivotally mounted a bell crank lever 65. One end 66 of this lever projects through a slot 67 in the wall of the housing, and the other end is provided with an offset portion 68 which, when the first named end 66 of the lever is moved downwardly in the slot 67, will be brought into frictional engagement with the tire of the adjoining wheel 55. A spring 69 tends to hold the lever in a retracted position as shown in Fig. 20, but when the exposed end 66 of the lever is moved downwardly in the slot 67 against the action of the spring 69, and is then moved transversely into the laterally extended lower portion 71 of the slot, the lever will be locked in a position wherein the offset end 68 is forcibly engaged with the wheel 55 and will thereby constitute an effective brake preventing rotation of the wheel.

With reference to Fig. 2, it will be noted that the upper wall of each of the housing chambers 7 and 9 is provided with two slots 72, 72 and 73, 73, the slots of these respective pairs being located toward the front and rear of the base structure respectively. Extending from the chamber 7 through each of the slots 72 is an arm 74, the inner end of which is pivotally connected to the guide channels 62 and 63 as indicated at 75 in Fig. 5. Corresponding arms 76, 76 are similarly pivotally secured at 77 to the guide channels 62 and 63 of the chamber 9 and project through the slots 73. Secured to the outer end of each of the arms 74 is a hinge 78, and the outer section of each of these hinges is secured to a screened panel 79. By movement of the arms 74 about their pivot pins 75, the panel 79 may be folded inwardly into the interior of the body member 1, as shown in Fig. 5, or may be elevated by a reverse adjustment of the arms 74 to an upright position above the wall 6, as shown in Fig. 12. It will be noted that the panel 79 extends substantially the full length of the one side of the body. From this upright position the panel 79 may also be turned outwardly on the hinges 78 for a purpose hereinafter set forth.

Secured directly to the outer ends of the arms 76, 76 is a screened panel 81 which by adjustment of the arms 76 about the pivot pins 77 may be moved to a position in the interior of the body 1, as shown in Fig. 5, or may, like panel 79, be elevated to an upright position on the side wall structure 8, this panel corresponding in length to said wall. The panel 81 has a set of inwardly projecting lugs 82, 82 and 83, 83 at the opposite ends respectively to which are pivotally connected, through the medium of corresponding lugs 84, 84 and 85, 85, front and rear panels 86 and 87 respectively. These panels may occupy folded positions against the inner face of the panel 81 as shown in Figs. 5, 6 and 12, or they may be turned out to the positions best shown in Fig. 1 wherein, with the panels 79 and 81, they form a rectangular screened enclosure at the top of the walls of the body 1. When the front and rear panels are folded against the inner face of the panel 81 they may be turned inwardly with the latter panel into the interior of the body structure as illustrated in Figs. 5 and 6. When the panels are elevated into the positions shown in Fig. 1, the outer free ends of the front and rear panels may be positively and releasably interlocked with the front and rear edge portions of the panel 79 in a manner hereinafter described.

The front and rear panels 86 and 87 each comprises telescoping sections, 88, 89 and 91, 92 respectively, these telescoping sections permitting extension of the panels to increase their effective lengths. Thus the front and rear panels are adjustable as to length in accordance with the aforedescribed adjustments of the body structure to increase or decrease the effective width of the latter. When the relatively adjustable sections of the body structure are telescoped to afford the lesser width, the sections of the front and rear panels may be correspondingly telescoped as shown in Fig. 1; and when the body structure is expanded, the front and rear screened panels may also be expanded as illustrated in Fig. 13. The manner in which the sections of the front and rear panels are telescopically united is well shown in Fig. 7.

In either position the same means are effective to lock the panels in their upright positions. The sections 89 and 92 of the front and rear panels are provided at their outer ends and undersides with pins 93 and 94 respectively, which are adapted to fit into apertures 95 and 96 in the top of the side wall 6 of the body, and at the front and rear ends of the latter respectively (see Figs. 2 and 12). The screened panel 79 carries at each end a pair of projecting lugs 97, 97 and 98, 98 respectively, which are adapted to abut the end edge surfaces of the panels 86 and 87 or more precisely the sections 89 and 92 of these front and rear panels, as shown in Figs. 1 and 13. Each of the upper lugs 97 and 98 of the respective pairs (see Fig. 8) comprises a circumferentially grooved pin 99 which is adapted to enter a socket opening 101 in the outer end edge of the front or rear panel as the case may be, and a latching element 102, indicated in broken lines in Fig. 8, is slidably mounted in the frame of each of the front and rear panels and may be slid into operative engagement with the circumferential groove of the pin 99, after the latter has been inserted in the socket, by means of an actuating pin 103 which is secured to the latch and projects outwardly through a slot 104 in the frame. By this means the upper ends of the front and rear panels may be positively interlocked with the upper ends of the panel 79. The several panels are thus united in a rigid structure which extends upwardly from the walls of the body as well illustrated in the drawings.

With reference to Fig. 1 and Figs. 9, 10 and 11, it will be noted that the rear wall 15 of the base structure has secured to its outer face a flanged element 105 which forms a downwardly tapered socket for reception of a handle element 106. The form of the element 105 and of the socket which it forms with the front wall 15 is best shown in Fig. 10. The handle 106 has at its lower end a tapered plate 107 the edges of which are turned forwardly, as indicated at 108 in Fig. 11, so as to form an end member of substantial effective thickness fitting nicely within the socket 109 formed as previously described by the element 108. Secured to the inner faces of the flanges 108 are a pair of spring arms 110 which terminate at their upper ends in out turned hooks 111, each of the arms having a pin 112 which projects through a hole in the adjoining flange 103 and which when the said end member is inserted in the socket 108, enter apertures 113, 113 in the opposite side walls respectively of the socket and thereby lock the handle to the body 1. The pins 112 may be released from the apertures 113 by pressing the hooks 111 to flex the arms 110 inwardly.

The handle itself extends at an angle from the end member 107—108 and has a transverse handle bar 114 at its upper end, as shown in Fig. 1. In the present instance the handle 106 is composed of two telescoping parts 115 and 116 which are normally locked together by a pin 117 carried by the part 116, said pin projecting through and beyond registering apertures 120 and 121 in the telescoped elements and being mounted on a leaf-spring 118 secured in the interior of the member 116 as clearly shown in Fig. 9. Also secured to the spring 118 and projecting through an aperture in the wall of the member 116 is a release pin 119 by means of which the spring 118 may be flexed inwardly to displace the pin 117 from the aperture 121 in the tubular element 115 whereupon the two parts of the handle may be separated.

From the foregoing description it will be apparent that the structure described above affords a highly flexible device having multiple practical uses. In the form shown in Fig. 1, for example, with wheels extending and with the screened panels in operative positions at the top of the body structure, the device forms a highly practical stroller, or wheeled bassinet. For strolling purposes the handle 106 provides an efficient means for directing the carriage in the desired course.

In the extended form of Fig. 13, the device affords a relatively large playpen which may be supported either on the wheels or, with the wheels retracted, directly upon the floor or other support surface. In this case also the screened panels at the top provide a safe enclosure for the child.

The device, when folded, assumes the form of a highly portable, readily handled unit. Being composed of sheet aluminum, it is of relatively light weight. In this folded condition, the screened panels lie entirely within the confines of the body structure, this compact arrangement being afforded by the adjustable panel supporting arms 74 and 76 which may be turned inwardly in the slots 72 and 73 so as to lie entirely below the upper edges of the side walls of the base structure. With the wheels retracted, a compact, relatively flat package is afforded, as shown in Figs. 2 and 3, which may be readily carried by one or other of the handles 47, these handles being pivoted to the associated pins 33 and being adjustable to a carrying position, as shown in Figs. 2 and 3, or to a position against the adjoining side of the body as shown in Figs. 12 and 13.

It is to be noted that the spring suspension of the wheel assemblies described above, provides the comfort and freedom from shock required in a device of this character.

There may be modification in detail of the structure described above without departure from the principle of the invention. It might be desirable, for example, as a means for reducing the overall weight, to skeletonize the base or body structure without affecting the functional relation of the parts, and use of the terms "wall" and "panel" in the appended claims is made with this in mind and without limitation as to the form of these elements with respect to whether they are solid as illustrated or of mesh or other open formation.

I claim:

1. In a portable folding and adjustable playpen, a metallic base structure comprising a bottom, side and end walls, said structure being formed of two telescopic sections each comprising a side wall, and end and bottom wall panels which overlap the corresponding end and bottom wall panels of the other section, means for maintaining the sections slidably in the telescopic relation so as to provide for relative adjustment of the sections between alternative extended and retracted positions wherein the effective width of the base section is increased or decreased as desired, cooperating means on said sections for releasably interlocking the sections in each of the alternative positions, screened panel means adjustably attached to the base structure at the upper edges of the side walls of the respective sections, said panel means extending substantially the full length of the side walls and being adjustable between alternative extended and retracted positions, in the first of which positions the panel means extends substantially vertically upwardly from the upper edges of the walls of the base structure, and in the second of which positions the panel means lies within the open top of the base structure, said panel means including adjustable end elements adapted in the extended position to overlie the end walls and comprising relatively slidable telescoping sections providing for extension and retraction of the effective width of the said end elements according to the relative adjustments of the base sections, and means for detachably securing the screened panel means and end elements in the extended position to form a solid enclosure at the top of the base structure.

2. In a utility device of the character described a base structure formed at opposite sides with open-bottomed chambers, and wheel assemblies mounted in said chambers, each said assembly comprising wheels, a frame for said wheels, means for retracting said wheels into the said frame and for projecting said wheels downwardly from the frame to provide a support for said frame, and means resiliently supporting said base structure for vertical movement on said frame.

3. A device according to claim 2 wherein a pivot pin is provided extending laterally through said frame approximately at the mid section thereof, said pin extending also through vertical slotted openings in the side walls of the respective open-bottomed chamber to limit the vertical displacement of said base structure relative to said frame, while permitting pivotal movement of said base member about said pivot pin controlled by said resilient supporting means.

4. A device according to claim 3 wherein the ends of the wheel frames are supported in vertical guides in said chamber.

5. A device according to claim 4 wherein each of the wheel frames includes a shaft at each end having affixed thereto an arm on the outer end of which a wheel is journaled, and wherein means is provided in operative association with the said pivot pin for rocking the shafts and to thereby retract and extend the said wheels into and from the bottom of said chamber.

6. A device according to claim 5 wherein the said pivot pin is provided with a cam, and transmission elements operatively connecting the cam with the wheel shafts, and wherein further means is provided outside of the chambers for rocking the said pin.

7. A device according to claim 6 wherein the pin rocking means consists in each case of a handle element adjoining the outer surface of the associated side wall, said handle elements constituting also a means for lifting the base structure.

8. A playpen according to claim 1 wherein the telescopic end elements of the screened panel means are hingedly attached to the ends of one of the side elements so as to fold against a face of the latter.

9. A playpen according to claim 1 wherein the screened side panel elements are attached to arms pivotally secured to the base structure and angularly adjustable in planes normal to the planes of the side walls of the base structure so as to afford the adjustability of the screened panel elements between the alternative retracted and extended positions.

10. A playpen according to claim 9 wherein one of the screened panel side elements is hinged to the said arms so as to provide for angular movement of the panel with respect to the arms about a pivotal axis parallel to the pivotal axis of the arms.

JONATHAN ELMER.

REFERENCES CITED

The following references are of record in the file of this patent:

UNITED STATES PATENTS

| Number | Name | Date |
|---|---|---|
| 1,193,272 | Laforest | Aug. 1, 1916 |
| 1,306,614 | Novick | June 10, 1919 |
| 1,630,941 | Hood | May 31, 1927 |
| 2,486,067 | Schroeder | Oct. 25, 1949 |

FOREIGN PATENTS

| Number | Country | Date |
|---|---|---|
| 615,824 | Great Britain | June 12, 1949 |